United States Patent [19]
Ando

[11] Patent Number: 5,769,390
[45] Date of Patent: Jun. 23, 1998

[54] FLOW CONTROL VALVE

[75] Inventor: Shosaku Ando, Atsugi, Japan

[73] Assignee: Nissan Motor Co., Ltd., Kanagawa, Japan

[21] Appl. No.: 665,114

[22] Filed: Jun. 14, 1996

[30] Foreign Application Priority Data

Jun. 22, 1995 [JP] Japan .................................... 7-155834

[51] Int. Cl.$^6$ ................................................. F16K 31/04
[52] U.S. Cl. ................................. 251/129.11; 251/129.05
[58] Field of Search ......................... 251/129.01, 129.09, 251/129.1, 129.11, 129.12, 129.05; 123/571

[56] References Cited

U.S. PATENT DOCUMENTS

| | | | |
|---|---|---|---|
| 4,742,989 | 5/1988 | Akagi | 251/129.12 X |
| 5,351,935 | 10/1994 | Miyoshi et al. | 251/129.11 |
| 5,503,131 | 4/1996 | Ohuchi | 123/571 |
| 5,579,743 | 12/1996 | Kadowski | 251/129.11 X |

FOREIGN PATENT DOCUMENTS

| | | |
|---|---|---|
| 56-158934 | 12/1981 | Japan . |
| 62-96770 | 5/1987 | Japan . |
| 1-203646 | 8/1989 | Japan . |
| 5-543 | 1/1993 | Japan . |

Primary Examiner—Kevin Lee
Attorney, Agent, or Firm—McDermott, Will & Emery

[57] ABSTRACT

A valve is connected to a valve stem, and is closed by the elastic force of a spring acting on it via the valve stem. The valve is opened, on the other hand, when a stepping motor displaces the valve stem coaxially against the force of the spring via a rotor shaft. A predetermined clearance D is set between the rotor shaft in a predetermined position and the valve stem in a seating position. When a fault is detected in the closing of the valve, the rotor shaft is displaced beyond this clearance D so as to directly drive the valve stem in the valve closing direction and thereby close the valve forcibly without the agency of the spring.

8 Claims, 3 Drawing Sheets

FLOW CONTROL VALVE

FIELD OF THE INVENTION

This invention relates to a valve which opens and closes depending on a stepping motor responsive to an electronic pulse and on a load exerted by a spring.

BACKGROUND OF THE INVENTION

Exhaust gas recycling (EGR) systems recirculating a part of the exhaust of an engine into an intake passage of the engine, control a flowrate of the recirculating exhaust by a control valve, for example, in response to a signal from a control unit.

A flowrate control valve applied to this type of usage is disclosed by Tokkai Hei 1-203646, published by the Japanese Patent Office in 1989, which describes a flow control valve using a stepping motor of which the rotor is made to rotate through a fixed angle by a pulse signal.

In this flowrate control valve, the valve is fixed to the tip of a valve stem, and an EGR passage is blocked when the valve is pushed by a spring so that it sits in a valve seat.

The stepping motor is provided with a rotor comprising a magnet and a solenoid which functions as a stator. A gear mechanism is provided which converts the rotation of the rotor to a linear motion, and when the rotor is rotated, a rotor shaft is displaced in an axial direction via the gear mechanism. The rotor shaft is connected to a valve stem, and when the rotor shaft is displaced in a predetermined direction, the valve lifts away from the valve seat against the force of the spring.

A valve lift amount is directly proportional to the rotation angle of the rotor, and the rotation angle of the rotor depends on a step number of the pulse input. If the valve lift amount is determined from a target flowrate and a step number pulse signal corresponding to this lift amount is input to the stepping motor, therefore, the flowrate in the EGR passage can be controlled to the target flowrate,.

In this flowrate control valve, the origin of the displacement of the rotor shaft is determined by a stopper that limits the displacement. From a manufacturing viewpoint, however, it is difficult to make this origin coincide with the sitting position of the valve. The rotor shaft and valve stem are therefore constructed separately, and elastically connected.

Due to this construction, the rotor shaft may be located anywhere within the sitting position of the valve and the aforesaid displacement origin when the valve is in its closed position. Hence, the stepping motor is adjusted when the engine is started such that the rotor shaft is located within this range. This prevents wear on the stopper and prevents shifting of the origin due to deterioration of parts, hence changes of the valve seat position due to wear of the valve and valve seat can also be absorbed. This stop position adjustment of the rotor shaft is referred to as initialization of the stepping motor.

However, in the case of an EGR valve through which engine exhaust passes, carbon or other deposits adhere to the valve stem and tend to give rise to bite between the valve and valve seat. In this case, the displacement resistance of the valve stem increases, the valve stem sticks to surrounding parts and there is a possibility that the valve may not be able to sit in the valve seat. In general, during engine idle periods when the engine rotation is unstable, the EGR valve is closed so that EGR is not performed, but if the valve is not in full contact with the valve seat, EGR gas becomes mixed with intake air even during the engine idle periods and engine operation becomes still more unstable.

As a means of resolving this problem, it is not appropriate to change the spring load of the spring pushing the valve or vary the capacity of the stepping motor. For example if the spring load of the spring is increased, the closing force of the valve increases, however the surplus propelling force, i.e. the value obtained by subtracting the reaction of the spring from the propelling force of the motor decreases, and the valve opening response is impaired.

SUMMARY OF THE INVENTION

It is therefore an object of this invention to forcibly close the valve without the intervention of a spring when a force of the spring can not sit the valve in the valve seat.

In order to achieve the above object, this invention provides a flow control valve comprising a valve body, a valve seat in which the valve body is seated for closing the valve, a valve stem connected to the valve body which is displaced in a valve closing direction according to a compressive load in an axial direction, an elastic mechanism which applies the compressive load to the valve stem, a rotor shaft coaxial with the valve stem, a connector which elastically connects the rotor shaft with the valve stem, a stepping motor which displaces the rotor shaft in an axial direction, a first mechanism which drives the stepping motor such that the rotor shaft is set in a predetermined position while compressing the connector, wherein the rotor shaft has a predetermined clearance D relative to the valve stem in a valve body seating position when the shaft is in the predetermined position, a mechanism for detecting a fault in the seating of the valve body, and a second mechanism which drives the stepping motor such that the rotor shaft moves in the direction of the valve stem beyond the clearance D when the fault is detected.

This invention also provides a flow control valve comprising a valve body, a valve seat in which the valve body is seated for closing the valve, a valve stem connected to the valve body which is displaced in a valve closing direction according to a tensile load in an axial direction, an elastic mechanism which applies the tensile load to the valve stem, a rotor shaft coaxial with the valve stem, a stepping motor which displaces the rotor shaft in an axial direction, a hook attached to the rotor shaft which pulls the valve stem according to the displacement of the shaft in a direction away from the valve stem, a first mechanism which drives the stepping motor such that the rotor shaft is set in a predetermined position, wherein the hook has a predetermined clearance D relative to the valve stem in a valve body seating position when the shaft is in the predetermined position, a mechanism for detecting a fault in the seating of the valve body, and a second mechanism which drives the stepping motor such that the rotor shaft moves in a direction away from the valve stem beyond the clearance D when the fault is detected.

The details as well as other features and advantages of this invention are set forth in the remainder of the specification and are shown in the accompanying drawings.

DESCRIPTION OF THE PREFERRED EMBODIMENTS

Figure 1:
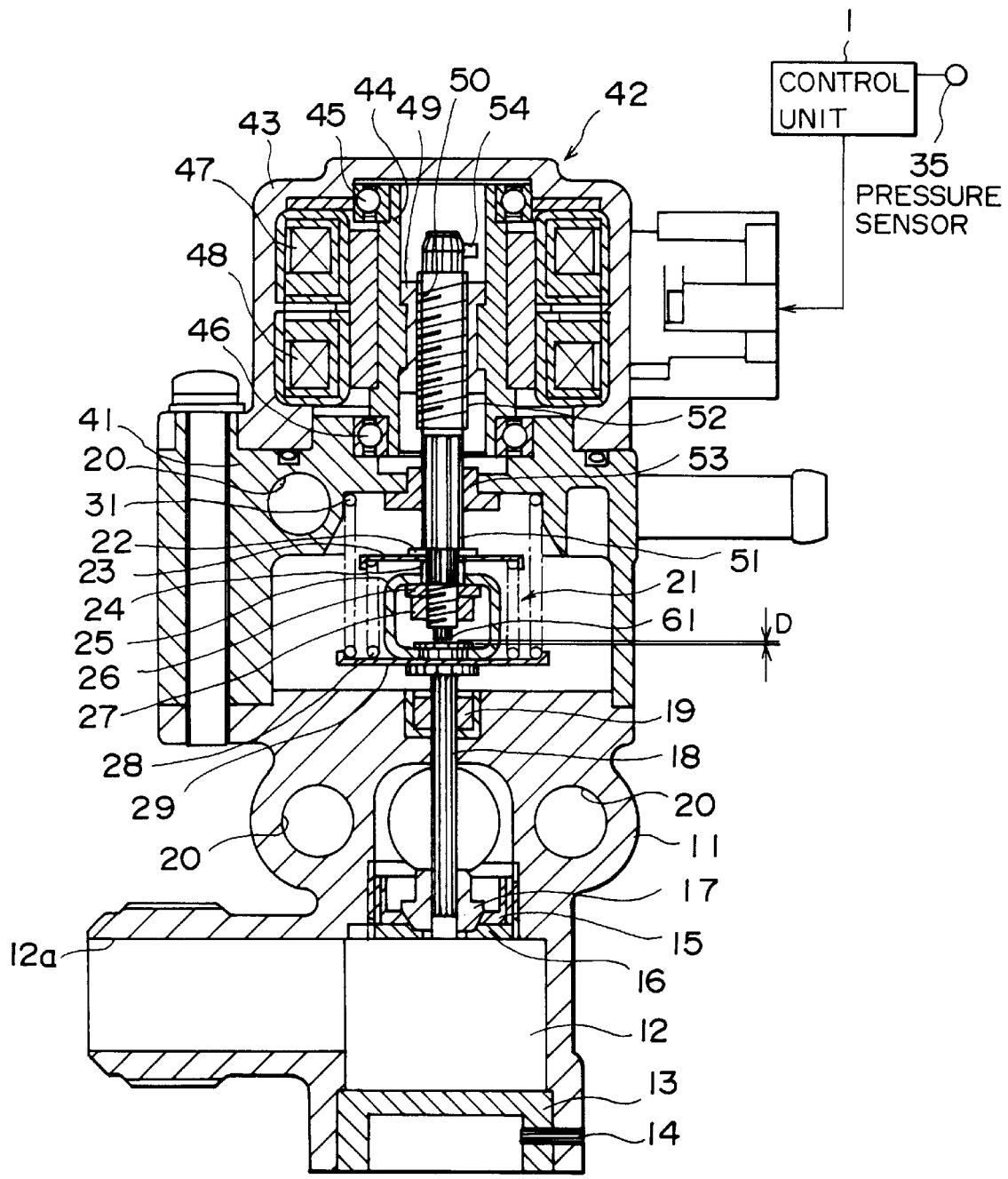
FIG. 1 is a vertical sectional view of an EGR valve according to this invention.

Referring to FIG. 1 of the drawings, a gas passage 12 is formed in a valve case 11 of a flowrate control valve, one opening 12a of this passage 12 which opens toward the left of the figure being connected to the exhaust passage of an automobile engine, and the other opening, not shown, being connected to an intake passage of this engine. The lower end of the passage 12 is sealed by a plug 13 and a knock pin 14.

A valve seat 15 and orifice 16 are provided in the passage 12, the passage 12 being closed when a valve 17 sits in a valve seat 15. The valve 17 is opened and closed by a valve stem 18 which is fixed to the valve 17 and extends upwards. The upper end of the valve stem 18 is connected to the lower end of a coaxial rotor shaft 51 via an elastic connector 21. The rotor shaft 51 is driven in an axial direction by a stepping motor 42 situated above it.

The valve stem 18 is connected to the elastic connector 21 inside a connector case 41 which is joined to the upper end of the valve case 11. A gas seal 19 which slides on the valve stem 18 is attached to the valve case 11 to prevent gas leaking from the passage 12 into the connector case 41. A cooling water passage 20 is formed in the valve case 11 and connecting case 41, the inside of these cases being cooled by cooling water which recirculates through the passage 20.

The elastic connector 21 has the following construction.

A stepped part is formed in the rotor shaft 51, and a washer 22, spring seat 23 and collar 24 are fitted on the outer circumference of the shaft 51 under the stepping part. The upper end of a ring-shaped link 25 slides on the outer circumference of the collar 24. The washer 22, spring seat 23 and collar 24 are fixed to the rotor shaft 51 by tightening a nut 27 on the lower end of the shaft 51 via a washer 26 inside the link 25.

A spring seat 29 is supported on the upper end of the valve stem 18, and the lower end of the link 25 is also fixed to this upper end by clamping. A coiled spring 28 is interposed between the spring seats 23 and 29, and another coiled spring 31 is interposed between the spring seat 29 and connector case 41.

The stepping motor 42 is situated above the connector case 41 so as to drive the rotor shaft 51 in an axial direction. The stepping motor 42 is formed inside a case 43 joined to the upper part of the connector case 41.

The stepping motor 42 is provided with a cylindrical rotor 44 having a plurality of N and S poles arranged alternately in a circumferential direction. The rotor 44 is supported free to rotate at the center of the case 43 by two roller bearings 45, 46. Two solenoid units 47, 48 working as a stator are fixed to the case 43 surrounding the rotor 44. The solenoid units 47, 48 comprise N and S poles which are formed alternately along the inner circumference of coils when the solenoid coils are energized, these poles being equal in number to the magnetic poles of the rotor 44. The solenoid coils are bifilar coils formed by winding two wire filaments over one another such that their ends protrude separately from the coil. The solenoid units 47, 48 therefore comprise four pairs of filaments. When the units 47, 48 are energized, an energizing current is input as a pulse signal from the control unit 1 which comprises a microcomputer. In this energization, two phase energization occurs wherein the pulse signal is input to any two pairs of the four pairs of filaments of the units 47, 48. The energization is "unipolar" energization wherein there are only two states, ON or OFF.

This construction of the stepping motor 42 is already known from Tokko Hei 5-543 published by the Japanese Patent Office in 1993.

In this manner, the rotor 44 rotates according to the pulse signal. A sleeve 49 is fixed to the inner circumference of the rotor 44. A female screw 50 is cut into the sleeve 49, and a male screw 52 formed at the upper part of the shaft 51 fits to this female screw 50. A stopper 54 is attached to the upper end of the rotor shaft 51 which projects upwards through the sleeve 49, this stopper 54 limiting the downward displacement of the shaft 51 when it comes in contact with the sleeve 49. A spline is formed midway along the shaft 51, this spline engaging with and passing through a bush 53 which is fixed to the connecting case 41. The shaft 51 is therefore supported free to displace axially within certain limits while its rotation is restricted. Due to the aforesaid construction, when the rotor 44 rotates, this rotation is translated into a linear motion by a mechanism comprising the female screw 50 and male screw 52.

Therefore, when for example the rotor 44 rotates in a clockwise direction as viewed from above, the shaft 51 is displaced upwards, and the valve stem 18 lifts the valve 17 against the force of the spring 31 via the link 25.

On the other hand, when the rotor 44 is rotated in an anticlockwise direction, the shaft 51 is displaced downwards, and the motion of the shaft 51 is transmitted to the valve stem 18 via the elastic force of the spring 28. The reason for transmitting a force in the valve closing direction via the spring 28 is in order to cope with overstroke of the shaft 51. In other words, after the valve 17 is seated, if the shaft 51 continues to displace in the valve closing direction, the link 25 displaces upward relative to the shaft 51 along the collar 24, and excessive displacement of the shaft 51 is absorbed by contraction of the spring 28.

The downward displacement of the shaft 51 is limited when the stopper 54 in the upper part of the shaft 51 comes in contact with the sleeve 49. This position is therefore the origin of the displacement of the shaft 51.

In flowrate control valves driven by a stepping motor, it frequently occurs that the origin of the displacement of the shaft 51 determined by the stopper 54 is different from the seating position of the valve 17. However even in this case, the elastic connector 21 is compressed and the shaft 51 is driven to the origin of the motor after the valve 17 has been seated.

Due to this construction, the shaft 51 is held in a suitable position between the seating position of the valve 17 and the origin. This prevents wear of the stopper 54, ensures that the displacement origin does not deteriorate with time, and absorbs changes of the seating position due to wear of the valve 17 and valve seat 15.

Figure 2:
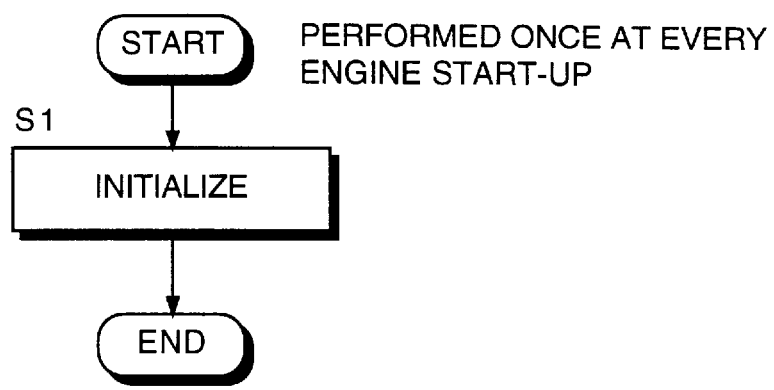
FIG. 2 is a flowchart showing an initializing process according to this invention.

The adjustment whereby the shaft 51 is held between the valve seating position and displacement origin is referred to as initialization. As shown for example by a step S1 in the flowchart of FIG. 2, initialization is performed each time the engine is started by a pulse signal input from the control unit 1 to the stepping motor 42.

Describing this initialization in more detail, taking a position in which it is desired to hold the shaft 51 as for example step 0, positive steps 1, 2, 3 . . . are set in the valve opening direction and negative steps −1, −2 . . . are set in the valve closing direction. The valve is designed so that the position of the shaft 51 is step 3 when the valve 17 is seated in the valve seat 15, and the limiting position of the shaft 51 due to the stopper 54 is between −1 and 0. According to experiments carried out by the inventors, when the valve 17 is in the vicinity of the seating position and two phase energization is performed in a predetermined sequence with this setting, the shaft 51 first reaches a limiting position at a predetermined step number, and then reaches a position slightly higher than the limiting position corresponding to step 0 in several steps. Therefore, provided the valve is in the vicinity of its seating position when the engine has stopped, the shaft 51 can be set to the step 0 position by performing two phase energization in a predetermined number of steps in a predetermined sequence.

To perform this initialization, a predetermined clearance (e.g. from 0.1 mm to several tenths of mm) is required between the shaft 51 and the valve stem 18.

In an EGR valve, exhaust flows through the passage 12. Hence, if a deposit adheres to the valve stem 18 which is exposed to the exhaust and this deposit becomes ingrained between the valve 17 and valve seat 15, it is possible that the displacement resistance of the valve stem 18 will increase so that it sticks to surrounding parts and the valve cannot be seated.

To resolve this problem, it is not advisable to change the spring load of the spring pushing the valve or vary the capacity of the stepping motor. This is because if the spring load is increased, for example, although the closing force of the valve increases, the surplus propelling force, i.e. the value obtained by subtracting the reaction of the spring from the propelling force of the motor decreases, and the valve opening response is impaired.

Figure 3:
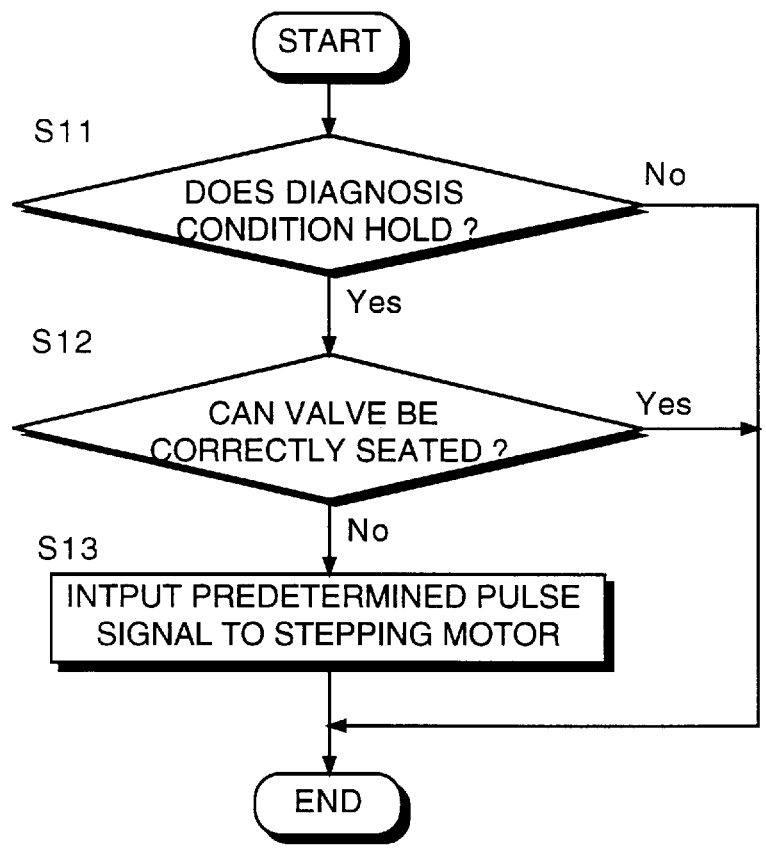
FIG. 3 is a flowchart showing a valve forced closure process according to this invention.

According to this invention, an extension 61 is formed at the lower end of the shaft leaving only a clearance D required for initialization between the shaft 51 and valve stem 18 in the seating position of the valve 17. When the valve 17 has fallen into a fail mode wherein the valve 17 cannot be seated due to the aforementioned reason, the control unit 1 drives the shaft 51 beyond the clearance D by the process shown in FIG. 3, hence the valve stem 18 is directly driven via the extension 61 so that the valve 17 is closed forcibly.

First, in a step S11, the control unit 1 determines whether or not the engine running conditions are suitable for diagnosing a fault in the valve 17. This is done by determining whether or not the engine load, rotation speed and cooling water temperature are within predetermined ranges.

When the diagnosis conditions are satisfied, it is determined whether or not the valve 17 can be correctly seated. As a criterion for this diagnosis, for example, an engine intake negative pressure $P_1$ after initialization is detected by a pressure sensor 35 installed in the intake pipe, and compared with an intake negative pressure $P_0$ measured previously when the valve 17 was closed under identical running conditions. When the valve 17 is not closed, exhaust is recirculated, so the engine intake negative pressure $P_1$ falls. Therefore, when $P_1$ is less than $P_0$ by a predetermined value or greater amount in the initialized state, it is determined that the valve 17 cannot be correctly seated. This diagnostic method is known from Tokkai Sho 56-158934 published by the Japanese Patent Office in 1981.

The aforesaid diagnosis may be performed also by measuring the temperature in the passage 12 downstream of the valve 17. When the valve 17 is not closed, part of the exhaust flows into the intake pipe via the passage 12, and the temperature of the passage 12 downstream of the valve 17 rises. Therefore, by comparing the temperature downstream in the passage in the initialized state with the temperature of the same part measured previously when the valve 17 was closed under identical running conditions, it can be determined whether or not the valve 17 is correctly seated. This diagnostic method is known from Tokkai Sho 62-96770 published by the Japanese Patent Office in 1987.

When it is determined, as a result of this diagnosis, that the valve 17 is not correctly seated, the shaft 51 is driven downwards by outputting a pulse signal to the stepping motor 42 in a step S13 so that the valve 17 is closed forcibly.

When the shaft 51 is driven in the valve closing direction due to rotation of the stepping motor 42, the lower end of the extension 61 comes in contact with the top of the valve stem 18, and the propelling force of the stepping motor 42 directly applies a force in the valve closing direction to the valve stem 18. As a result, even when the valve 17 cannot be closed by the spring load of the spring 28 due to increase of displacement resistance of the valve stem 18, and even if the spring 28 is damaged, the valve can be closed forcibly.

The aforesaid process need not be performed frequently, it being sufficient to perform it for example once each time the vehicle runs.

According to this embodiment, the extension 61 was formed on the shaft 51, however it will of course be understood that the valve stem 18 may alternatively be extended upwards.

Figure 4:
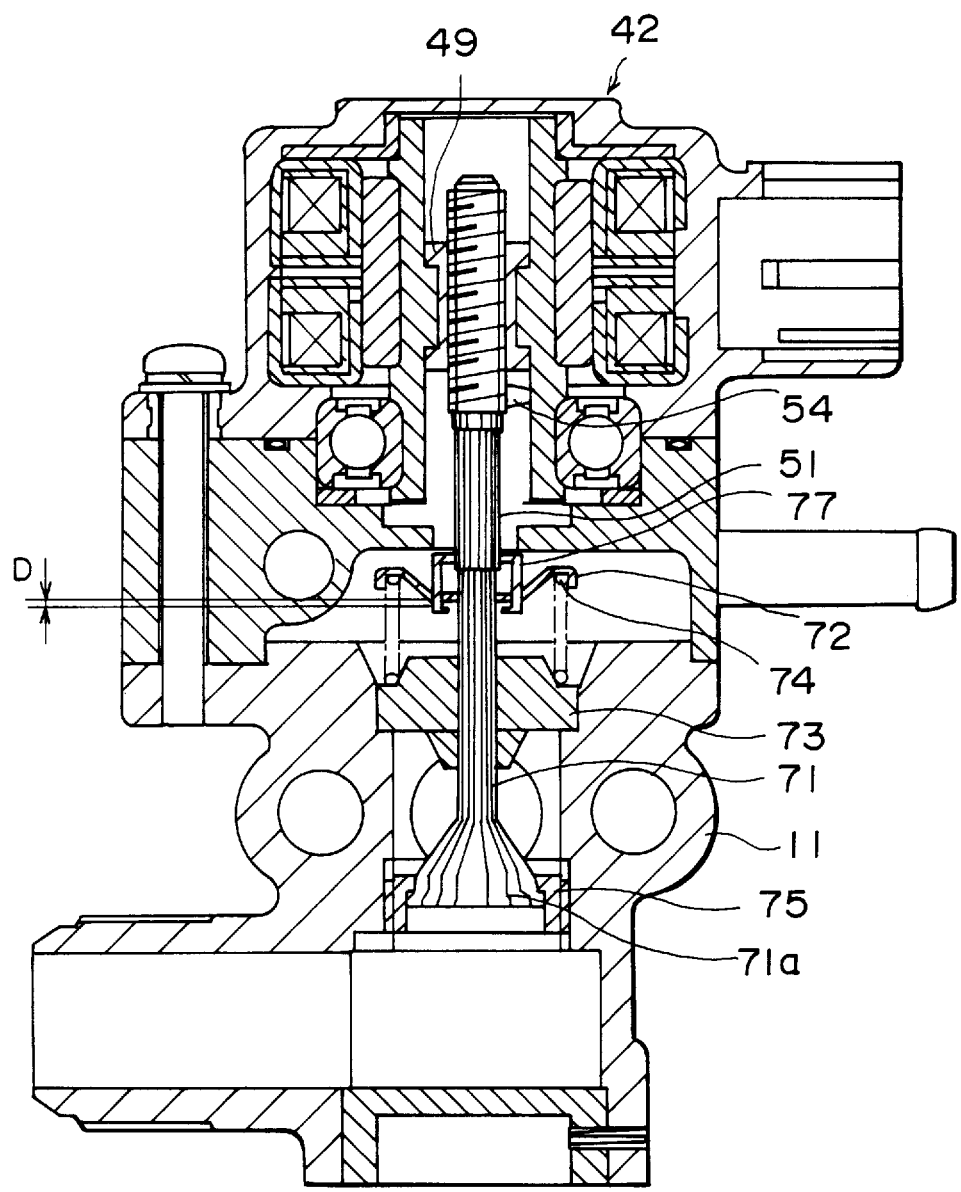
FIG. 4 is a vertical sectional view of an EGR valve according to another embodiment of this invention.

Next, another embodiment of this invention will be described with reference to FIG. 4.

A major difference from the first embodiment is that whereas in the first embodiment, the valve 17 is opened by pulling the valve stem 18 towards the stepping motor 42, in this embodiment, the valve is opened by pushing a valve stem 71 away from the stepping motor 42.

The construction of this embodiment is also simpler insofar as the elastic connector 21 of the first embodiment is not present. Describing this construction in further detail, a valve 71a is provided at the lower end of the valve stem 71, and a spring seat 72 is fixed to the upper part of the valve stem 71. The valve stem 71 is pushed upwards, i.e. in the valve closing direction, by a spring 74 held between a retainer 73 fixed to the valve case 11 and this spring seat 72.

The lower end of the shaft 51 is coaxial and comes in contact with the upper end of the valve stem 71, a hook 77 being attached to the lower end of the shaft 51. The lower end of the hook 77 passes through the spring seat 72, and this end is bent inwards such that it can engage with the spring seat 72 when the shaft 51 is lifted. Such an arrangement is also possible that the hook 77 is attached to the valve stem 71 while the spring sheet 72 is fixed to the lower part of the shaft 51.

The construction of the stepping motor 42 is substantially the same as that of the first embodiment, however the stopper 54 is situated below the sleeve 49 so as to limit the upward displacement of the shaft 51.

Valve opening is performed by driving the shaft 51 downwards by outputting a pulse signal to the stepping motor 42, thereby displacing the valve stem 71 downwards against the force of the spring 74 so that the valve 71a separates from a valve seat 75.

Initialization is performed, starting from the state wherein the valve 71a is seated in the valve seat 75, by driving the stepping motor 42 in the valve closing direction, and driving the shaft 51 upwards. When a downward force no longer acts on the valve stem 71 due to the upward displacement of the shaft 51, the valve closing force of the valve stem 71 pushed by the spring 74 increases, and when the shaft 51 moves upwards, the lower end of the hook 77 directly exerts an upward force on the spring seat 72. Also, when the two phase energization step number exceeds a certain number, the shaft 51 then moves downwards in the opposite direction. Hence by performing two phase energization after a predetermined step number in a predetermined sequence, after the shaft 51 has risen to a position limited by the stopper 54, it is set to a position corresponding to step 0 as in the first embodiment.

According to this embodiment, the clearance D required for initialization is set between the lower end of the hook 77 and the spring seat 72. As in the case of the first embodiment, when it is determined that the valve 71a is not correctly seated, the shaft 51 is driven upwards beyond the clearance D, and the valve 71a is forcibly closed by the propelling force of the stepping motor 42.

Hence, even when the valve cannot be closed by the spring load of the spring 74 alone due to an increase of the displacement resistance of the valve stem 71 or even when the spring 74 is damaged, the valve 71a can be closed forcibly.

The aforesaid two embodiments have been described in the case of an EGR valve driven by a stepping motor, however this invention may be applied also to other types of valve driven by a stepping motor such as, for example, a purge valve which supplies fuel vapor from a fuel tank to an intake passage of an engine.

The embodiments of this invention in which an exclusive property or privilege is claimed are defined as follows:

What is claimed is:

1. A flow control valve comprising;

a valve body, a valve seat in which said valve body is seated for closing the valve, a valve stem connected to said valve body which is displaced in a valve closing direction according to a compressive load in an axial direction, elastic means which applies said compressive load to said valve stem, a rotor shaft coaxial with said valve stem, a connector which elastically connects said rotor shaft with said valve stem, a stepping motor which displaces said rotor shaft in an axial direction, means to drive said stepping motor such that said rotor shaft is set in a predetermined position while compressing said connector, said rotor shaft having a predetermined clearance D relative to said valve stem in a valve body seating position when said rotor shaft is in said predetermined position, means for detecting a fault in the seating of said valve body, and means to drive said stepping motor such that said rotor shaft moves in a direction of said valve stem beyond said clearance D when said fault is detected.

2. A flow control valve according to claim 1, wherein said means to drive said rotor shaft to clearance D comprises initialization control means.

3. A flow control valve according to claim 1, wherein said means to drive said rotor shaft beyond said clearance D comprises a control unit.

4. A flow control valve according to claim 1, wherein said means to drive said rotor shaft to and beyond clearance D comprises a single control unit.

5. A flow control valve comprising;

a valve body, a valve seat in which said valve body is seated for closing the valve, a valve stem connected to said valve body which is displaced in a valve closing direction according to a tensile load in an axial direction, elastic means which applies said tensile load to said valve stem, a rotor shaft coaxial with said valve stem, a stepping motor which displaces said rotor shaft in an axial direction, a hook attached to said rotor shaft which pulls said valve stem according to the displacement of said shaft in a direction away from said valve stem, means to drive said stepping motor such that said rotor shaft is set in a predetermined position, said hook having a predetermined clearance D relative to said valve stem in a valve body seating position when said rotor shaft is in said predetermined position, means for detecting a fault in the seating of said valve body, and means to drive said stepping motor such that said rotor shaft moves in a direction away from said valve stem beyond said clearance D when said fault is detected.

6. A flow control valve according to claim 5, wherein said means to drive said rotor shaft to clearance D comprises initialization control means.

7. A flow control valve according to claim 2, wherein said means to drive said rotor shaft beyond said clearance D comprises a control unit.

8. A flow control valve according to claim 2, wherein said means to drive said rotor shaft to and beyond clearance D comprises a single control unit.

* * * * *